(No Model.) 4 Sheets—Sheet 1.

L. R. TURNER.
COTTON HARVESTER.

No. 515,031. Patented Feb. 20, 1894.

WITNESSES:
Paul Johat
C. Sedgwick

INVENTOR
L. R. Turner
BY
Munn & Co.
ATTORNEYS (No Model.)
L. R. TURNER.
COTTON HARVESTER.
No. 515,031. Patented Feb. 20, 1894.
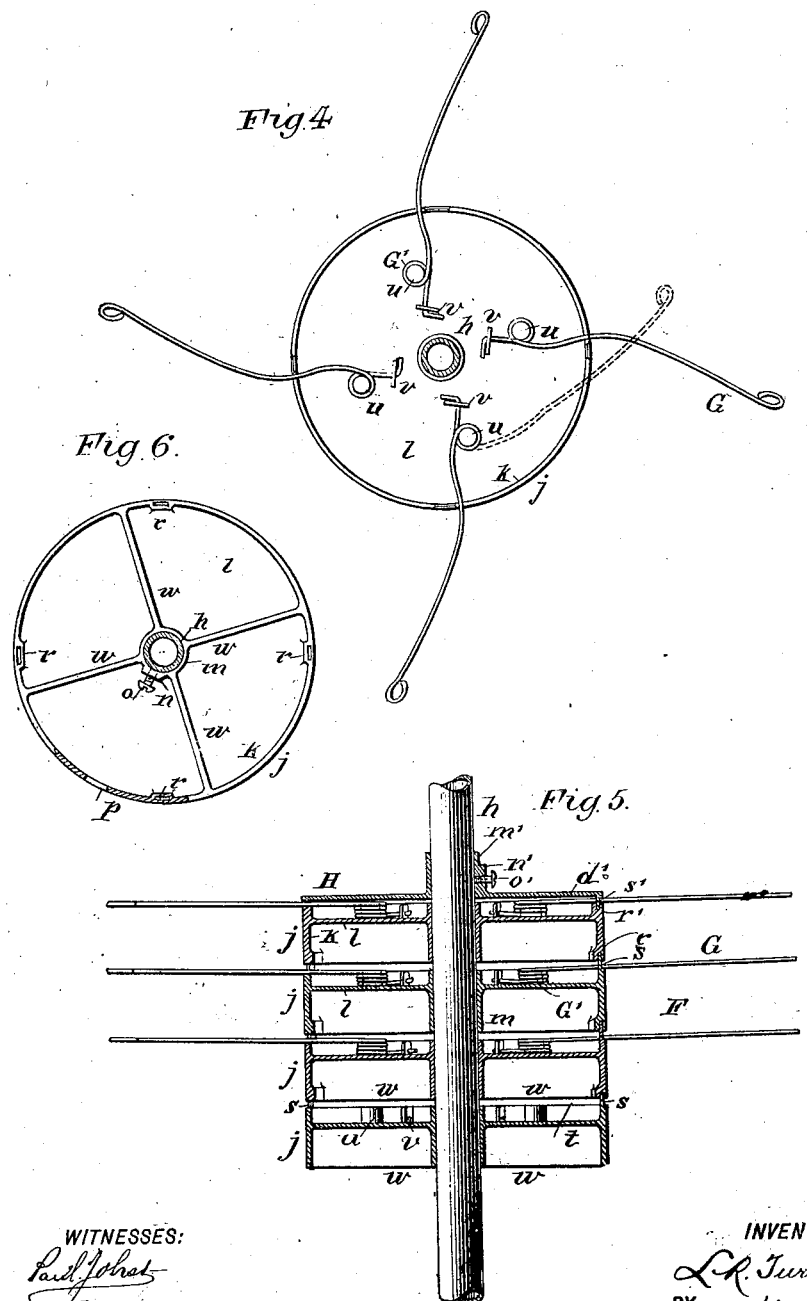

(No Model.) 4 Sheets—Sheet 3.
L. R. TURNER.
COTTON HARVESTER.
No. 515,031. Patented Feb. 20, 1894.
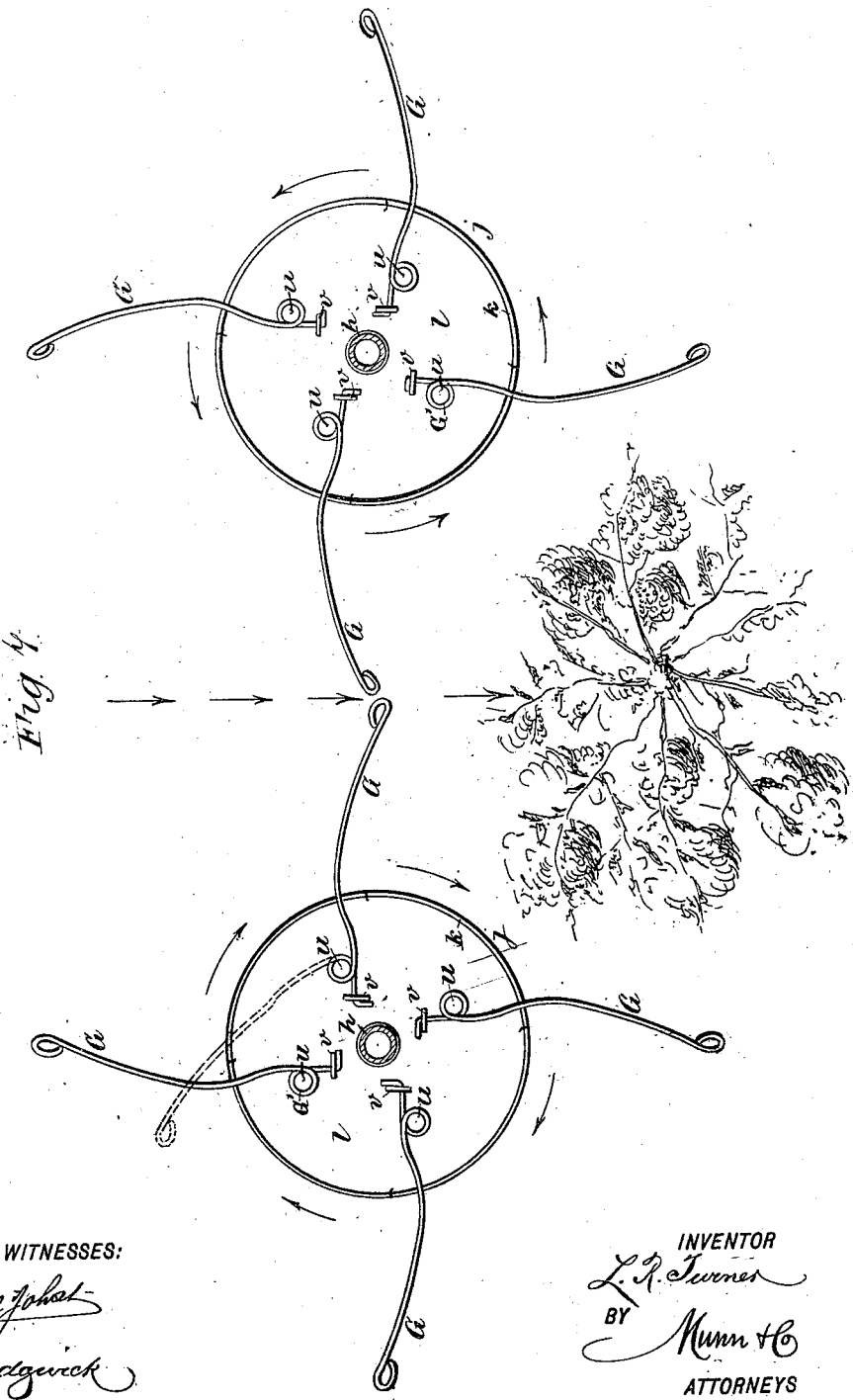

(No Model.)
L. R. TURNER.
COTTON HARVESTER.
No. 515,031. Patented Feb. 20, 1894.
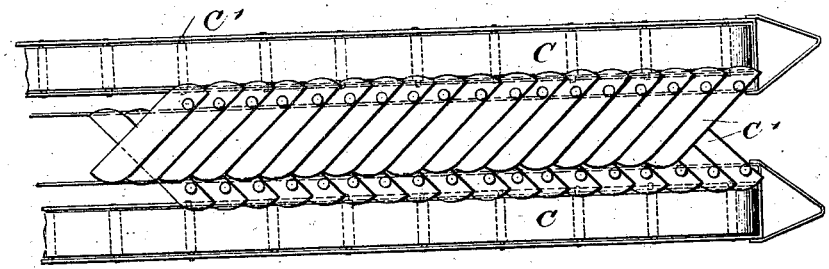
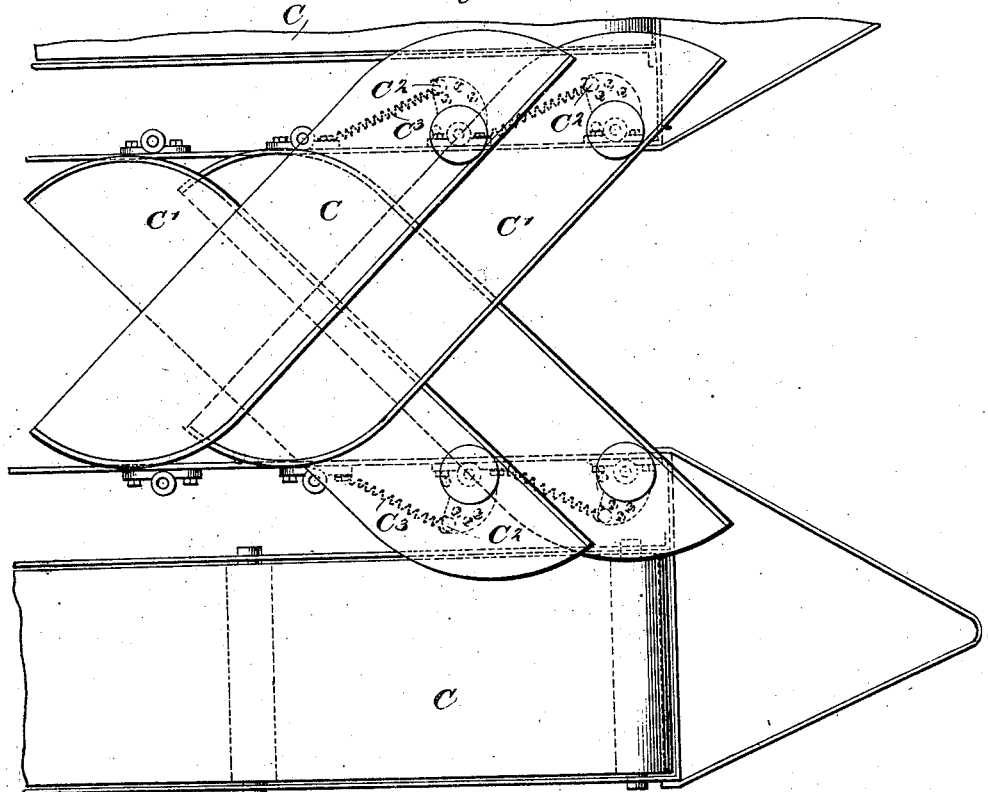
WITNESSES:
Paul Johal
C. Sedgwick
INVENTOR
L. R. Turner
BY
Munn & Co
ATTORNEYS.

UNITED STATES PATENT OFFICE.

LEONARD R. TURNER, OF SING SING, ASSIGNOR TO THE SOUTHERN COTTON HARVESTER COMPANY, OF NEW YORK, N. Y.

COTTON-HARVESTER.

SPECIFICATION forming part of Letters Patent No. 515,031, dated February 20, 1894.

Application filed February 27, 1893. Serial No. 463,979. (No model.)

*To all whom it may concern:*

Be it known that I, LEONARD R. TURNER, of Sing Sing, in the county of Westchester and State of New York, have invented a new and Improved Cotton-Harvester, of which the following is a specification, reference being had to the annexed drawings, forming a part thereof, in which—

Figure 1:
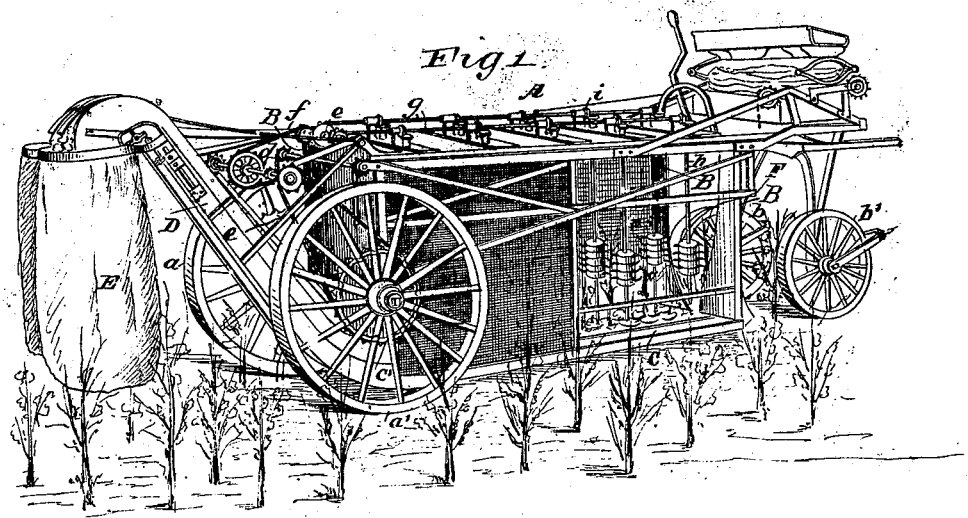
Figure 2:
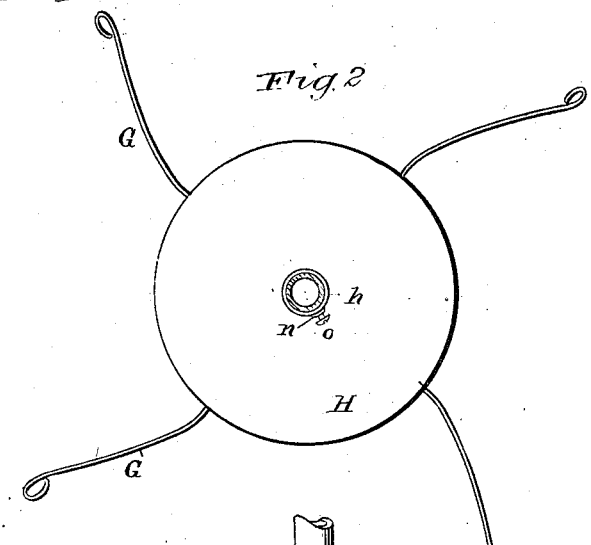
Figure 3:
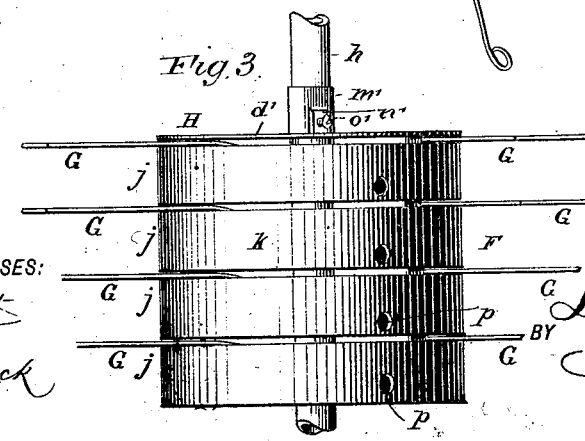

Figure 1 is a perspective view of my improved cotton harvester. Fig. 2 is a plan view of one of the fenders and its whips. Fig. 3 is a side elevation of the same. Fig. 4 is a plan view of one of the fenders with the top removed. Fig. 5 is a vertical transverse section of one of the fenders. Fig. 6 is an inverted plan view, partly in section, of one of the sections of a fender. Fig. 7 is a plan view of two sections of the fenders with their caps removed, showing the relative arrangement of the fenders and whips. Fig. 8 is a broken plan view, showing the yielding floor and the carriers; and Fig. 9 is a broken enlarged detail plan view of the front end of the floor and carriers.

Similar letters of reference indicate corresponding parts in all the views.

The object of my invention is to construct a cotton harvesting machine in which the cotton will be removed from the plants by slight concussions on the stalks of the plants, or on the bolls, thereby loosening the cotton which has matured, while leaving the unopened bolls undisturbed.

My invention consists in the combination with a suitable driving mechanism, of a series of cylindrical fenders carrying resilient whips capable of turning back on their pivotal supports, and at the same time swinging into the fenders when coming in contact with an obstruction, such as the branch or boll of a cotton plant, and of springing forward when released from the obstruction and delivering a blow upon other branches or bolls of the plant, thereby loosening the ripe cotton and delivering the cotton to the conveying mechanism, all as will be hereinafter more fully described.

The body A, of my improved cotton harvester, is supported upon wheels $a$, $a'$, $b$, $b'$. The said body is provided at the top with a frame for supporting the side pieces B, the said side pieces being each provided with a floor furnished with a series of pivoted plates on opposite sides of a central longitudinal slot extending through the body, and allowing of the passage through the machine of the cotton plants from which the fiber is to be gathered. The swinging plates allow the stalks and branches to pass through, but are closed before and behind the branches, thus constituting a practically complete floor for receiving cotton removed by the mechanism presently to be described.

In the floor of the side pieces B, are arranged endless carriers C, which receive the cotton and convey it to the rear of the machine, delivering it to the elevator D, which carries the cotton upwardly and discharges it into sacks E.

The yielding floor and carriers form no part of the present invention. Their construction and arrangement briefly described are as follows, see Figs. 8 and 9. The carriers C are suitably supported to leave a central longitudinal passageway through the machine, which passageway is covered by the yielding flooring composed of a series of oppositely disposed pivoted plates $C'$ that overlap at their free ends. Suitably connected with each plate near its pivot, as at $C^2$, is a spiral spring $C^3$, the opposite ends of the springs being secured to any suitable support. The springs normally throw the plates $C'$, so as to cover the passage.

Upon the wheels $a$, $a'$, are placed the sprocket wheels $c$, $c'$, which drive the shaft $d$ by means of chains connecting said sprocket wheels with sprocket wheels on the shaft $d$, and the said shaft $d$ communicates motion to the shaft $e$ through the chain $f$ connecting the sprocket wheels on the shaft $d$ with sprocket wheels on the shaft $e$, and the shaft $e$, through bevel gearing, drives the shafts $g$ extending along the top of the body A, and the said shafts $g$ communicate rotary motion to vertical shafts $h$ journaled in the side pieces B, B, by means of the miter gearing $i$.

The machine as described up to this point is not new, and does not form a part of the mechanism specially claimed in the present application, and will therefore require no further description.

Upon the shafts $h$ are placed cylinders or fenders F, formed of sections $j$. The cylinders or fenders upon opposite sides of the machine are precisely alike, with the exception of being oppositely arranged with respect to each other, therefore a description of one of the fenders will answer for all. Each section $j$ of the fender F, consists of a hollow cylindrical rim $k$, attached to or formed integrally with the hub $m$, which is fitted to the shaft $h$. The hub of each section $j$ is provided with a boss $n$, which is bored and tapped to receive the screw $o$ for clamping the section on the shaft, and in the rim $k$ is formed an aperture $p$, through which may be inserted a screw driver in order to turn the screw $o$, and in the lower part of the rim of each section are formed sockets $r$, at equidistant points around the rim $k$, for receiving the tongues $s$ projecting from the rim $k$ of the next section below, the said tongues being of such length as to seat in the sockets $r$, thus supporting the sections $j$ in such relation to each other as to leave a slot $t$ between adjacent sections.

The web $l$ is provided with bosses $u$, for receiving the spiral part G' of the resilient whips G. The web $l$ is also provided with four ears $v$ for receiving the angled ends of the resilient whips G. The said resilient whips G are preferably made of spring steel wire, the spiral G' which surrounds the boss $u$ consisting of three or four convolutions. This spiral G' forms a reinforcing spring to the resilient whip G. The portion of the whip G which projects through the slot $t$ is curved forward slightly, so that the whip presents a concave front side.

Each section $j$ of the fender is provided with arms $w$, formed integrally with the web $l$, and the said arms of the upper section, when the spirals G' of the whips G are put upon the bosses $u$, extend over the bosses $u$ of the next section below, and so on throughout the series of sections forming the fenders, the arms $w$ serving to hold the spiral portions G' of the resilient whips G on the bosses $u$.

The upper section $j$ of the fender is closed at the top by a cover H, formed of a disk $d'$, provided with a hub $m'$ furnished with a boss $n'$ and set screw $o'$, the said screw serving to clamp the cover H in its position over the upper section of the fender. The said upper section is provided with sockets $r'$, which receive tongues $s'$ projecting downwardly from the cover H.

The fenders F are arranged in two series, in the present case of five in each series, one series being upon either side of the central longitudinal slot through the bottom of the body A, and the rotary motion imparted to the fenders is such as to cause the whips G in the center of the machine to swing toward the forward end of the body A, thus meeting the plants as they enter the front of the machine.

When one of the resilient whips G strikes a branch of a cotton plant or a boll, or a number of branches, the fender is carried around, while the whip G is detained by the branches and partially folds within the fender and takes the position shown in dotted lines in Fig. 4, whereupon the branches or other obstructions slip from the end of the whip, and the whip swings forward by its own elasticity, striking a blow upon any portion of the plant lying in front of it, thereby jarring the branches or the bolls with sufficient force to loosen the ripe cotton and cause it to fall to the bottom of the body A, unless during its fall it is struck by the revolving whips and carried out laterally to the side of the machine, where it falls upon the traveling belt or endless carrier. As the whip swings or folds back into the fender as described, the sliding motion of the whip along the slot $t$, tends to strip the whip of any cotton adhering to it. Owing to the great elasticity of the whips, the blows delivered to the plant by the several whips are not such as to injure the stalks, branches, or green bolls, but are sufficient to loosen and detach the ripe cotton from the bolls already opened.

The revolving fenders and whips may be placed at different heights for different parts of the harvesting season, being placed low down in the machine for the early portion, in an intermediate position for the middle portion, and at a higher elevation for the latter portion of the harvest when the bolls are ripe at the top of the plant.

It is obvious that I may attach the resilient whips and fenders to any known form of mechanism that will move them into the path of the cotton plants, carry them forward and cause them to engage the branches and bolls of the cotton plants, and afterward to slip off and strike other branches and bolls so as to loosen the ripe cotton, therefore I do not limit myself to the exact form and arrangement of the parts herein shown and described.

The effectiveness of the whips it will be seen is not alone due to their resiliency, but results also from the fact that they yield bodily from the point $u$, to permit the forward movement of the fender surface, independently of the intersecting portions of the whips when the latter meet the resistance of the plants.

I do not claim herein the yielding platform shown in Figs. 8 and 9, as the same is claimed in application filed by me and C. A. Weller on August 4, 1892, Serial No. 442,163.

Having thus fully described my invention, I claim as new and desire to secure by Letters Patent—

1. A cotton harvester provided with a picking device comprising a revoluble fender formed in its rim with segmental guiding slots, and resilient whips secured at their inner ends within the said fender and projecting with their free ends through the said guiding slots and beyond the rim of the said fender, substantially as shown and described.

2. A cotton harvester provided with a picking device comprising a fender made in sections, and a set of resilient whips interposed between two adjacent sections and projecting with their free ends beyond the rim of the fender, substantially as shown and described.

3. A cotton harvester provided with a picking device comprising a revoluble fender made in circular sections, and formed with segmental guiding slots between two adjacent sections, and a set of resilient whips secured to the interior of the fender and each whip projecting with its free end through one of the said slots and a suitable distance beyond the periphery of the fender, substantially as shown and described.

4. A cotton harvester provided with a picking device comprising a fender made in sections, and a set of resilient whips interposed between two adjacent sections and projecting with their free ends beyond the rim of the fender, each of the said whips being secured at its inner end to the interior of the fender, and limiting stops for the said whips on the said fender, substantially as shown and described.

5. A cotton harvester provided with a picking device comprising a revoluble fender made in circular sections, forming segmental guiding slots between each two adjacent sections, a series of resilient whips interposed between each two adjacent sections, each whip being fastened to the corresponding section between the rim and center of the section, and guided loosely in a corresponding slot, the whip projecting a suitable distance beyond the rim of the fender, substantially as shown and described.

6. In a cotton picker, the combination of rotary whips and a fender therefor, the whips being connected at a point within the fender, extending outward therethrough, and yielding from a point within the fenders, thus permitting a forward rotary movement of the fender surface independently of the intersecting portions of the whips when the latter meet resistance, substantially as described.

7. In a cotton picker, the combination of yielding rotary whips, and a fender therefor, the whips being secured at a point within the fender, extending outward therethrough, and the fender having slots or openings that permit a rotary movement of the fender surface independent of the intersecting portions of the whips when the latter meet resistance, substantially as described.

8. In a cotton harvester, a cylinder fender section formed or a hub, web, rim, arms, bosses and ears, and resilient whips having reinforcing springs or spirals which are placed on the bosses of the fenders and furnished with angled ends inserted in the ears of the fenders, substantially as specified.

9. In a cotton harvester, a revoluble fender provided with slots arranged at right angles to the axis of the fender, and spring whips connected with the inner portions of the fender and projecting through the slots, substantially as specified.

10. In a cotton harvester, a revoluble chambered fender provided with slots arranged at right angles to the axis thereof, and spring whips connected with the interior of the fender at or near the advancing or forward ends of the slots and projecting through the said slots in an approximately radial direction, substantially as specified.

11. In a cotton harvester, a revoluble chambered fender formed of series of sections $j$ placed on the shaft $h$, leaving slots $t$ between the sections, and spring whips G, placed on bosses $u$ in the interior of the sections and extending through the slots, each section being provided with radial arms $w$ for strengthening the web and rim, and for retaining the spring whips on their bosses, substantially as specified.

LEONARD R. TURNER.

Witnesses:
BENJAMIN F. KIFT,
WINFIELD S. SMITH.